US012800544B2

(12) United States Patent
Saito et al.

(10) Patent No.: US 12,800,544 B2
(45) Date of Patent: Nov. 17, 2026

(54) SENSOR DEVICE

(71) Applicant: KABUSHIKI KAISHA TOSHIBA, Tokyo (JP)

(72) Inventors: Tatsuro Saito, Kawasaki (JP); Ko Yamada, Yokohama (JP); Yoshiaki Sugizaki, Fujisawa (JP); Miyuki Tabata, Tokyo (JP); Yuji Miyahara, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 715 days.

(21) Appl. No.: 18/180,943

(22) Filed: Mar. 9, 2023

(65) Prior Publication Data

US 2024/0110887 A1 Apr. 4, 2024

(30) Foreign Application Priority Data

Sep. 16, 2022 (JP) ................................ 2022-147971

(51) Int. Cl.
*G01N 27/407* (2006.01)
*B01L 3/00* (2006.01)

(52) U.S. Cl.
CPC ........ *G01N 27/4077* (2013.01); *B01L 3/5027* (2013.01); *B01L 2300/0645* (2013.01)

(58) Field of Classification Search
CPC .... G01N 27/4077; G01N 33/04; G01N 33/12; G01N 33/02; G01N 33/14; G01N 27/4146; B01L 3/5027; B01L 2300/0645
See application file for complete search history.

(56) References Cited

U.S. PATENT DOCUMENTS

| | | | | |
|---|---|---|---|---|
| 2009/0000957 | A1* | 1/2009 | Dubin | C12Q 1/001 205/688 |
| 2010/0112719 | A1* | 5/2010 | Doron | G01N 33/5438 422/68.1 |
| 2018/0080897 | A1* | 3/2018 | Miyamoto | G01N 33/0037 |
| 2019/0062818 | A1 | 2/2019 | Miki et al. | |
| 2020/0049654 | A1 | 2/2020 | Kajisa et al. | |
| 2020/0300804 | A1 | 9/2020 | Saito et al. | |
| 2022/0081702 | A1 | 3/2022 | Saito et al. | |

(Continued)

FOREIGN PATENT DOCUMENTS

| | | | |
|---|---|---|---|
| JP | 2013-152211 | A | 8/2013 |
| JP | 2020-153783 | A | 9/2020 |
| JP | 2020204522 | A | 12/2020 |

(Continued)

OTHER PUBLICATIONS

Espinoza-Hicks et al., "Condensation of Diacetyl with Alkyl Amines: Synthesis and Reactivity of p-Iminobenzoquinones and p-Diiminobenzoquinones," 2015, Molecules, vol. 20, pp. 20719-20740 (Year: 2015).*

(Continued)

*Primary Examiner* — Alexander S Noguerola
(74) *Attorney, Agent, or Firm* — Maier & Maier, PLLC

(57) ABSTRACT

According to one embodiment, a sensor device is a sensor device that detects an acetyl compound in a sample and includes a storage unit that stores a sample, a sensor section that comes into contact with the sample in the storage unit and detects a change in ion density, and an amino compound fixed to the sensor section.

16 Claims, 2 Drawing Sheets

(56) References Cited

U.S. PATENT DOCUMENTS

| | | | | |
|---|---|---|---|---|
| 2022/0136996 A1* | 5/2022 | Elías | G01N 27/4145 | |
| | | | 257/253 | |
| 2023/0064444 A1* | 3/2023 | Yeh | H01L 21/76844 | |

FOREIGN PATENT DOCUMENTS

| | | | |
|---|---|---|---|
| JP | 2022000033 | A | 1/2022 |
| JP | 202248731 | A | 3/2022 |
| WO | 2005090961 | A1 | 9/2005 |
| WO | 2018155369 | A1 | 8/2018 |

OTHER PUBLICATIONS

Sigma-Aldrich, "1-Pyrenebutyric hydrazide," 2025, Millipore Sigma, pp. 1-2 (Year: 2025).*

Shin et al., "Micelle-stabilized Olfactory Receptors for a Bioelectronic Nose Detecting Butter Flavors in Real Fermented Alcoholic Beverages," 2020, Scientific Reports, vol. 19, pp. 1-9 (Year: 2020).*

Office Action issued on Dec. 2, 2025, in corresponding Japanese Application No. 2022-147971, 13 pages.

Benvidi et al., "Development of a Carbon Paste Electrode Modified with Reduced Graphene Oxide and an Imidazole Derivative for Simultaneous Determination of Biological Species of N-acetyl-L-cysteine, Uric Acid and Dopamine", Electroanalysis, 2016, vol. 28, No. 7, pp. 1625-1633.

Fenoy et al., "Acetylcholine biosensor based on the electrochemical functionalization of graphene field-effect transistors", Biosensors and Bioelectronics, Oct. 22, 2019, vol. 148, No. 111796, 7 pages.

Kuwahara et al., "Preparation of Potentiometric Acetylcholine Sensor Using Electropolymerized Insulating Poly-1-Aminopyrrole with Polyion Complex", Electrochemistry, 2001, vol. 69, No. 8, 10 pages.

Park et al., "Scalable Functionalization of Polyaniline-Grafted rGO Field-Effect Transistors for a Highly Sensitive Enzymatic Acetylcholine Biosensor", Biosensors, Apr. 27, 2022, vol. 12, No. 5, 12 pages.

"Summary of Amine Protecting Groups", Mar. 20, 2019, 36 pages, searched on the internet by the JPO on Nov. 20, 2025, https://netdekagaku.com/prtotection-amino/.

* cited by examiner

SENSOR DEVICE

CROSS-REFERENCE TO RELATED APPLICATIONS

This application is based upon and claims the benefit of priority from Japanese Patent Application No. 2022-147971, filed Sep. 16, 2022, the entire contents of which are incorporated herein by reference.

FIELD

Embodiments described herein relate generally to a sensor device that detects an acetyl compound.

BACKGROUND

An acetyl compound which is an organic compound having an acetyl group such as diacetyl, for example, diacetyl is included in alcoholic beverages, fermented beverages, dairy products, meats, and the like. A sensor device capable of relatively easily detecting these acetyl compounds is required.

An object of the present invention is to provide a sensor device capable of relatively easily detecting an acetyl compound such as diacetyl.

DETAILED DESCRIPTION

Figure 1:
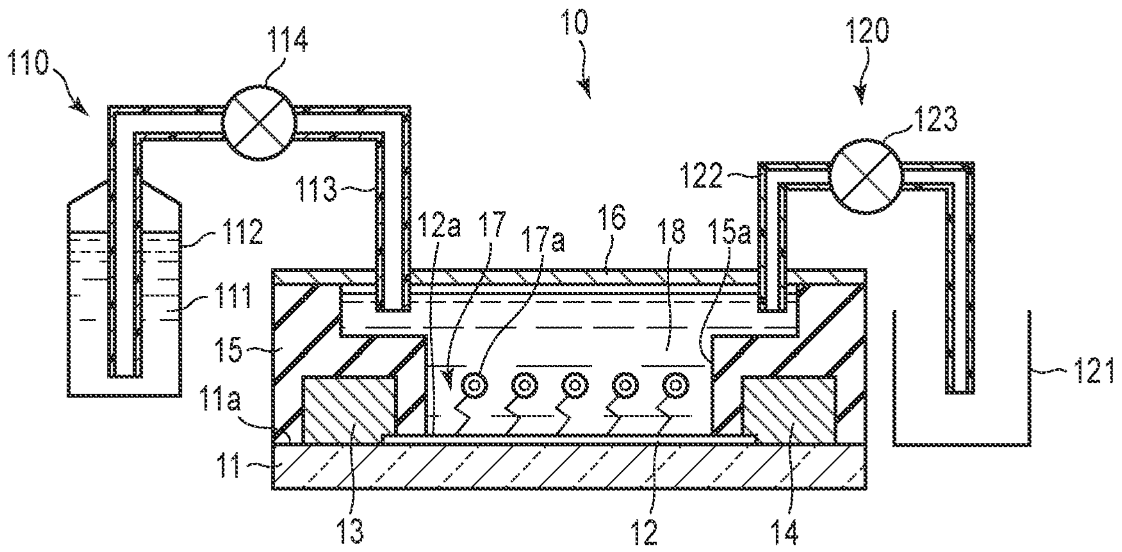
FIG. 1 is a schematic cross-sectional diagram showing a sensor device according to a first embodiment.

In general, according to one embodiment, a sensor device that detects an acetyl compound is provide.

A sensor device according to one embodiment is a sensor device that detects an acetyl compound in a sample. The sensor device includes a storage unit that stores a sample. The sensor device further includes a sensor section that comes into contact with the sample in the storage unit and detects a change in ion density, and an amino compound fixed to the sensor section. The sensor section detects a change in ion density based on a reaction between an acetyl group and an amino group. A sensor device according to one or more embodiments includes a substrate, a sensitive film provided on the substrate, a first electrode connected to one end of the sensitive film, a second electrode connected to another end of the sensitive film, and an amino compound fixed to the sensitive film.

In one or more embodiments, the sensor device further includes a supply mechanism for supplying the sample to the storage unit.

In one or more embodiments, the sensor section detects a change in ion density as a change in pH value, a change in potential or current. The change in pH value can be detected with a pH meter. The change in potential or current can be detected by a field effect transistor (FET) such as an ion selective field effect transistor (ISFET) or a graphene field effect transistor (graphene FET), a charge coupled device (CCD), or the like.

In one or more embodiments, the sensor section has a graphene FET structure in which a graphene film constitutes a channel region. An amino compound having one or more amino groups is fixed to the surface of the graphene film.

In one or more embodiments, the amino compound includes a cyclic aromatic amino compound. The cyclic aromatic amino compound has an aromatic moiety fixed to the surface of the graphene film by π-π interaction and a functional moiety having an amino group bonded to the aromatic moiety. Such a cyclic aromatic amino compound may be 1-pyrenebutyric acid hydrazide. The aromatic moiety is, for example, pyrene. The functional moiety is, for example, butyric acid hydrazide. The functional moiety can include, for example, a hydrazine structure containing an amino group, a hydrazone structure, a hydrazide structure and substituted structures thereof. As for the amino group, an amino compound having ($—NR—NH_2$) (R is any substituent, for example, a carbon substituent or H) structure strongly reacts with an acetyl compound. In one or more embodiments, the amino compound has two or more amino groups and has an amino group at each of two adjacent carbon atoms. Since an amino group reacts with two acetyl groups of diacetyl to cyclize with each of two carbon atoms, the product is stabilized. The functional moiety of such an amino compound may be ortho-phenylenediamine. Two adjacent carbon atoms may be two adjacent carbon atoms in one aromatic ring or two carbon atoms bonded by a double bond in an alkenyl having two amino groups in cis position. For example, when an ortho-phenylenediamine structure or a diaminoalkenyl ($—CNH_2═CRNH_2$) structure and diacetyl react with each other, an aromatic cyclic structure is formed in the product, so that the product is stabilized (see, as an example, Formula 2 below).

When the sensor section has a graphene FET structure, the cyclic aromatic amino compound can be fixed to the surface of the graphene film by π-π interaction. The amino compound does not need to be an aromatic compound as long as it is fixed to the surface of the graphene film. The amino compound may be adsorbed to the graphene film by π electrons of the double bond, or may be fixed by covalent bonding or electrostatic bonding with the graphene film.

In one or more embodiments, the sample in the storage unit is in an acidic state. When the sample is in an acidic state, the amino group ($—NH_2$) of the amino compound fixed to the surface of the graphene film is protonated ($—NH_3$+).

In one or more embodiments, each of the one or more amino groups is in a form protected by a protecting group. Such a protecting group may be a chloro group, a butoxycarbonyl group, a benzyloxycarbonyl group, a fluorenylmethyloxycarbonyl group, a trichloroethoxycarbonyl group, an allyloxycarbonyl group, a phthaloyl group, or a toluenesulfonyl group. When the amino group is protected by the protecting group, the sensor section is stabilized for a long period of time. The amino group and the protecting group are condensed, for example. The protecting group is removed in an acidic environment (for example, a sample in the storage unit which is in an acidic state). The amino group released by the removal of the protecting group is protonated as described above.

In one or more embodiments, the sample coexists with a Schiff base in the storage unit. The Schiff base may be, for example, sodium cyanoborohydride (SCB). In one or more embodiments, the sample coexists with the amino group-modified charge-labeled molecule in the storage unit.

In one or more embodiments, the sample is in a liquid form in the storage unit.

In one or more embodiments, the sample is in a gaseous form in the storage unit.

Hereinafter, some embodiments will be described with reference to the drawings. Each drawing is a schematic view for facilitating understanding of the embodiment, and shapes, dimensions, ratios, and the like thereof do not necessarily coincide with actual ones, but those skilled in the art can appropriately set and change the shapes, dimensions, ratios, and the like in consideration of the following description and known techniques.

Figure 2:
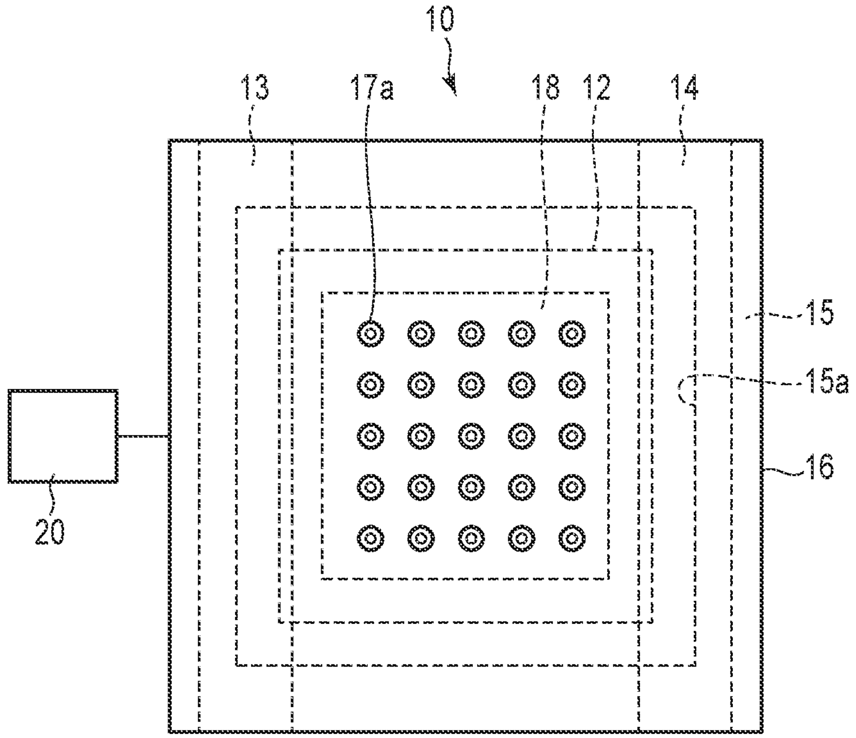
FIG. 2 is a schematic plan view of the sensor device shown in FIG. 1.

FIG. 1 is a schematic cross-sectional diagram showing a sensor device 10 of a first embodiment, and FIG. 2 is a schematic plan view of the sensor device 10 shown in FIG. 1. In FIG. 2, a liquid sample supply mechanism 110 and a liquid sample discharge mechanism 120 that discharges a liquid sample in FIG. 1 are omitted, whereas a heater 20 shown in FIG. 2 is not shown in FIG. 1.

As described in detail below, in the sensor device 10, the sensor section has a graphene FET structure.

The sensor device 10 includes a substrate 11. The substrate 11 has, for example, a rectangular plate shape. The substrate 11 is formed of, for example, silicon, glass, ceramics, a polymer material, metal, or the like. The size of the substrate 11 is not limited, and is, for example, 1 to 10 mm×1 to 10 mm×0.1 to 0.7 mm (width×length×thickness).

The substrate 11 may include, for example, an insulating film (not shown) on the surface 11*a* side. Such an insulating film can be formed of, for example, an electrical insulating material such as silicon oxide, silicon nitride, aluminum oxide, a polymer material, or a self-assembled film of organic molecules.

On the surface 11*a* of the substrate 11, a graphene film 12 is formed as a sensitive film. The graphene film 12 is a single-layer graphene film having a thickness corresponding to one carbon atom, but can be formed of a plurality of layers of graphene. The size of the graphene film 12 is not limited, but can be, for example, 0.1 to 500 μm×0.1 to 500 μm (width×length). Practically, when the size is 10 to 100 μm×10 to 100 μm, production is easy.

A source electrode 13 is provided on the surface 11*a* of the substrate 11 so as to be connected to one end of the graphene film 12. A drain electrode 14 is provided on the surface 11*a* of the substrate 11 so as to be connected to another end of the graphene film 12.

The source electrode 13 and the drain electrode 14 are formed of, for example, a metal such as gold (Au), silver (Ag), copper (Cu), palladium (Pd), platinum (Pt), nickel (Ni), titanium (Ti), chromium (Cr), or aluminum (Al), or a conductive substance such as zinc oxide (ZnO), indium tin oxide (ITO), indium gallium zinc oxide (IGZO), or a conductive polymer.

The source electrode 13 and the drain electrode 14 are electrically connected to a power supply (not shown). In the source electrode 13 and the drain electrode 14, for example, when a voltage (source-drain voltage (Vsd)) is applied from the power supply, a current (source-drain current (Isd)) flows from the source electrode 13 to the drain electrode 14 via the graphene film 12. At this time, the graphene film functions as a channel with respect to the source electrode 13 and the drain electrode 14.

A peripheral wall 15 is erected on the surface 11*a* of the substrate 11. The peripheral wall 15 surrounds the graphene film 12 and covers the outer peripheral surfaces of the source electrode 13 and the drain electrode 14. The peripheral wall 15 defines a storage unit 15*a* that stores a sample therein. The graphene film 12 constitutes the bottom of the storage unit 15*a*.

The peripheral wall 15 is formed of an electrically insulating material, for example, a polymer substance such as an acrylic resin, polyimide, polybenzoxazole, an epoxy resin, a phenol resin, polydimethylsiloxane, or a fluororesin, an inorganic insulating film such as silicon oxide, silicon nitride, or aluminum oxide, a self-assembled film of organic molecules, or the like.

A lid body 16 that is supported by the peripheral wall 15 and seals the storage unit 15*a* is provided. The lid body 16 can be formed of the insulating material as described above.

On the surface 12*a* of the graphene film 12, an amino compound 17 having one or more amino groups 17*a* is fixed. When the amino compound 17 is a cyclic aromatic amino compound having one or more aromatic rings (for example, a benzene ring), the amino compound can be immobilized on the surface 12*a* of the graphene film 12 by π-π interaction with the graphene film 12. One example of such an amino compound is 1-pyrenebutyric acid hydrazide having a condensed aromatic ring and having one amino group. Another example of such an amino compound is an ortho-phenylenediamine compound (ortho-phenylenediamine or a derivative thereof) in which an amino group is bonded to each of two adjacent carbon atoms in a benzene ring. The other amino compounds (for example, diaminoalkenyl or the like) have already been described above.

The one or more amino groups 17*a* may each be in a form protected by a protecting group. Such protecting groups have already been described above.

The sensor device 10 detects the presence/absence of an acetyl compound in a sample (liquid sample) in the form of a solution. Therefore, the sensor device 10 further includes the liquid sample supply mechanism 110 that supplies the liquid sample to the storage unit 15*a*.

The liquid sample supply mechanism 110 includes a first container (bottle) 112 containing a liquid sample 111, which is a liquid sample supply source installed to be separated from the peripheral wall 15. One end of a thin tube 113 is inserted into the liquid sample 111 in the bottle 112. Another end of the thin tube 113 penetrates the lid body 16 and is inserted into the storage unit 15*a*. The thin tube 113 sends the liquid sample 111 in the bottle 112 to the storage unit 15*a*. The thin tube 113 may be formed of, for example, a material such as glass, and the inner surface of the thin tube 113 may have hydrophilicity. The liquid sample introduced into the storage unit 15*a* is a direct detection target sample and is denoted by reference numeral 18 (FIGS. 1 and 2).

Capillary phenomenon can be used for supplying the liquid sample 111 in the bottle 112 into the storage unit 15*a* via the thin tube 113. When the capillary phenomenon is used, the inner surface of the thin tube 113 preferably has hydrophilicity. A stopcock 114 that opens and closes a flow path in the thin tube 113 is interposed in the thin tube 113.

After the detection is completed, the liquid sample 18 in the storage unit 15*a* is discharged by the liquid sample discharge mechanism 120. The liquid sample discharge mechanism 120 includes a second container 121 that collects the discharged liquid sample, installed to be separated from the peripheral wall 15. One end of a thin tube 122 is inserted into the second container 121. Another end of the thin tube 122 penetrates the lid body 16 and is inserted into the liquid sample 18 in the storage unit 15*a*. The thin tube 122 is formed of, for example, a material such as glass, and the inner surface of the thin tube 122 can have hydrophilicity. Capillary phenomenon can be used for discharging the liquid sample 18 in the storage unit 15*a* into the second container 121 via the thin tube 122. When the capillary phenomenon is used, the inner surface of the thin tube 113 preferably has hydrophilicity. A stopcock 123 that opens and closes a flow path in the thin tube 122 is interposed in the thin tube 122.

The use of the stopcock 114 and the stopcock 123 will be obvious to those skilled in the art.

Acetyl compounds such as diacetyl to be detected are included in alcoholic beverages, fermented beverages, dairy products, meats, and the like. The sensor device 10 can detect an acetyl compound contained in such a product. If the analysis target is a liquid itself such as alcoholic beverage or fermented beverage, it can be introduced into the first bottle 112 as the liquid sample 111. When the analysis target is in a state of air, exhalation, or a gas generated from a living body, a solid product (raw meat or the like), or the like, or a gas such as air around a solid product, or the like, the gas is blown into a solvent that dissolves the acetyl compound, and the obtained solution can be introduced into the first bottle 112. For example, diacetyl is soluble in water, alcohols, ethers, or mixtures thereof.

Meanwhile, although not shown in FIG. 1, as shown in FIG. 2, the sensor device 10 can include the heater 20 for heating the sample 18 in the storage unit 15*a* by being connected to the peripheral wall 15. By heating the sample in the storage unit 15*a* by the heater 20, the reaction between the amino compound 17 and the acetyl compound in the sample 18 can be promoted, and the detection can be performed more quickly. The heater 20 can also be installed inside the peripheral wall 15. The liquid sample 18 in the storage unit 15*a* can be heated to, for example, about 30° C. to 85° C. by the heater 20.

The fixation of the amino compound on the graphene film 12 can be performed, for example, by introducing a solution obtained by dissolving the amino compound in an aqueous solution of an alcohol (for example, isopropyl alcohol) (amino compound fixing solution) into the storage unit 15*a* to bring the solution into contact with the graphene film 12. As long as the amino compound in the solution has one or more aromatic rings (for example, benzene rings), the amino compound is fixed to the surface 12*a* of the graphene film 12 by π-π interaction as described above.

When the amino compound is fixed on the graphene film 12, the amino compound fixing solution is discharged from the storage unit 15*a*, and then an acid such as hydrochloric acid is introduced into the storage unit 15*a*. Then, the amino group of the amino compound fixed on the graphene film 12 is protonated to be $—NH_3^+$. At that time, Id (drain current)-Vg (gate voltage) in the graphene FET is measured. For example, the local minimum value of Id is read, and the numerical value is reported as charge neutral point (CNP) (first CNP).

Next, a liquid sample is introduced, and if an acetyl compound is present in the liquid sample, the ion density in the amino compound is decreased by a reaction:

$$R—NH_2^+ + R'—COCH_3 \longrightarrow R—NHCCH_3(OH)—R' + H^+ \qquad \text{(Formula 1)}$$

In any case, Id (drain current)-Vg (gate voltage) in the graphene FET after the liquid sample 18 is introduced into the storage unit 15*a* is measured, the local minimum value thereof is read, and the numerical value is reported as charge neutral point (CNP) (second CNP).

When there is no substantial difference between the first CNP value and the second CNP value, it can be determined that no acetyl compound is present in the sample 18. On the other hand, when there is a substantial difference between the first CNP value and the second CNP value, it can be determined that an acetyl compound is present in the sample 18.

Incidentally, the reaction product produced according to Formula 1 is dehydrated to produce Schiff base: $R—N{=}CCH_3$. This generated Schiff base is hydrolyzed in an aqueous medium to return to the original $R—NHCCH_3(OH)—R'$ (reversible reaction), and the measurement (detection) becomes unstable. Therefore, when the Schiff base is simultaneously introduced when introducing the liquid sample into the storage unit 15*a*, the reversible reaction can be inhibited, and stable measurement becomes possible. As the Schiff base, for example, sodium cyanoborohydride (SCB) can be used.

In addition, after the reaction between the amino compound and the acetyl compound in the storage unit 15*a*, a charge-labeled molecule modified with an amino group can be added to the reaction liquid in the storage unit 15*a*. In such an amino group-modified charge-labeled molecule, when the amino compound has one amino group and an acetyl compound having a plurality of acetyl groups (for example, diacetyl) is present in the sample, one amino group of the amino compound reacts with one acetyl group of the acetyl compound having a plurality of acetyl groups, but the remaining acetyl groups remain as they are. The remaining acetyl group is bound to the amino group-modified charge-labeled molecule, and the amino compound is charge-labeled. When an acetyl compound having only one acetyl group (for example, acetaldehyde) coexists in the sample, the acetyl compound reacts with an amino compound, and the charge of the amino compound disappears. Therefore, when the CNP value (second CNP value) at that time is compared with the first CNP value and there is a significant difference therebetween, it is found that the difference is based on the acetyl compound having a plurality of acetyl groups. That is, it is possible to detect only the acetyl compound having a plurality of acetyl groups in the sample. Examples of such a charge-labeled compound include a peptide in which the C-terminus containing one polar amino acid is modified so as not to react with an amino group. In addition, an aptamer, an antibody, or the like that captures a charge-labeled amino compound can also be used.

Incidentally, when the amino compound to be fixed to the graphene film 12 has one or more aromatic rings (for example, a benzene ring), the amino compound can be fixed to the surface 12*a* of the graphene film 12 by π-π interaction as described above. As such a compound, a compound having one amino group like 1-pyrenebutyric acid hydrazide can be used as described above. However, when the cyclic aromatic amino compound has an amino group at each of two adjacent carbon atoms in one aromatic ring, a ring structure is generated by a reaction with an acetyl compound having a plurality of acetyl groups such as diacetyl. An example of the generation reaction is shown below (the following Formula 2), taking as an example a case where the cyclic aromatic amino compound is ortho-phenylenediamine and the acetyl compound having a plurality of acetyl groups is diacetyl.

(Formula 2)

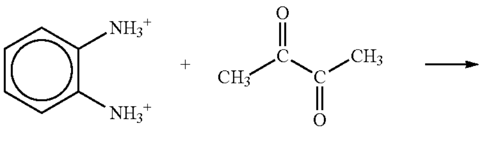

-continued

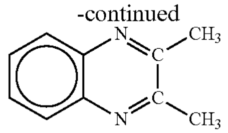

+ $2H_2O$ + $2H^+$

The reaction of Formula 2 is an irreversible reaction, unlike the reversible reaction shown above. Then, when the acetyl compound having a plurality of acetyl groups (for example, diacetyl) and the acetyl compound having only one acetyl group (for example, acetaldehyde) coexist in the liquid sample, acetaldehyde can react with only one of the two amino groups of ortho-phenylenediamine, and the reaction is eventually a reversible reaction as described above, and the amino group of ortho-phenylenediamine reacted with acetaldehyde returns to a cationized amino group ($—NH_3^+$) by the reversible reaction. Therefore, if the CNP value (second CNP value) at that time is significantly different from the first CNP value (CNP value before reaction with an acetyl compound) as described above, it can be confirmed that diacetyl is present in the sample.

Figure 3:
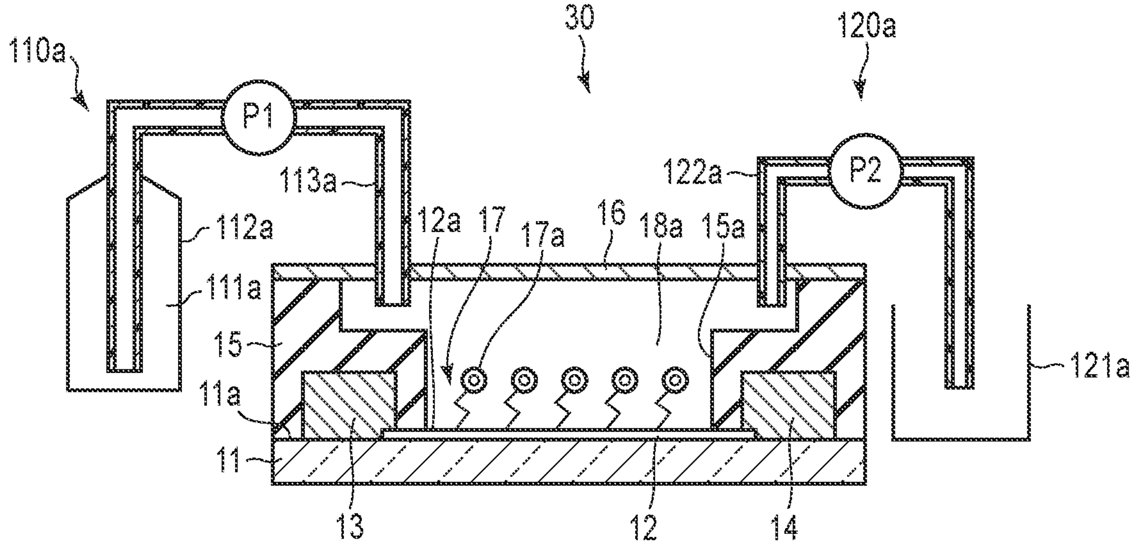
FIG. 3 is a schematic cross-sectional view showing a sensor device according to a second embodiment.

FIG. 3 is a schematic cross-sectional view showing a sensor device 30 according to a second embodiment. The sensor device 30 shown in FIG. 3 is configured to detect a sample in a gaseous form, and basically has the same configuration as the sensor device 10 of the first embodiment. However, the sensor device 30 includes, instead of the first container 112 that stores the liquid sample 111 in the sensor device 10, a third container 112*a* that stores a sample 111*a* in a gaseous form, and further includes, instead of the thin tube 113 including the stopcock 114, a thin tube 113*a* that does not need to be a capillary and has one end inserted into the third container 112*a* and another end penetrating the lid body 16 to face the storage unit 15*a*. The thin tube 113*a* is interposed with a pump P1 that feeds a sample in a gaseous form from the third container 112*a* to the storage unit 15*a*. In addition, instead of the thin tube 122 including the stopcock 123 in the sensor device 10, there is provided a thin tube 122*a* that does not need to be a capillary and has one end penetrating the lid body 16 to face the storage unit 15*a* and another end inserted into a fourth container 121*a*. The thin tube 122*a* is interposed with a pump P2 that feeds a sample in a gaseous form from the inside of the storage unit 15*a* to the fourth container 121*a*.

The sample in a gaseous form can, for example, cationize the amino compound by utilizing moisture in the air. In that case, the amino compound is preferably protected with an ion dissociative protecting group. Examples of such a protecting group include a chloro group which is removed from an amino group to become a chloride ion. The ion dissociative protecting group is separated from the amino group of the amino compound to become an anion, thereby making the ion concentration constant and contributing to stable detection.

Here, a method for detecting an acetyl compound using the sensor device shown in FIGS. 1 and 2 will be briefly summarized below.

First, a predetermined amino compound is dissolved in an amino compound-soluble solvent (for example, an alcohol aqueous solution), and the obtained amino compound solution is introduced into the storage unit 15*a* and allowed to stand as it is to fix the amino compound to the surface 12*a* of the graphene film 12.

Next, the solution of the acetyl compound is discharged from the storage unit 15*a*, and then an acid such as hydrochloric acid is introduced into the storage unit 15*a*, and the CNP value (first CNP value) is determined in this state.

After the measurement, the acid is discharged from the storage unit 15*a*.

Thereafter, the sample for which the presence or absence of the acetyl compound is to be detected is dissolved in an acetyl compound-soluble solvent such as alcohol, and the obtained acetyl compound solution is introduced into the storage unit 15*a* and allowed to stand as it is to sufficiently carry out the reaction between the amino compound and the acetyl compound. In this case, if necessary, a Schiff base may coexist in the acetyl compound solution.

Next, after the reaction liquid in the storage unit 15*a* is discharged, an acid such as hydrochloric acid is introduced into the storage unit 15*a*, and the CNP value (second CNP value) is determined in this state. At this time, the amino group-modified charge-labeled molecule may be simultaneously added into the storage unit 15*a*.

As described above, the CNP value is a numerical value obtained by measuring Id (drain current)–Vg (gate voltage) in the graphene FET and reading the local minimum value thereof.

Next, experimental examples will be described.

Experimental Example 1

The sensor device shown in FIG. 1 before the amino compound was fixed to the graphene film 12 and before the liquid sample was introduced was prepared. A 10 mM 1-pyrenebutyric acid hydrazide (1-PH) solution in an IPA aqueous solution having a volume ratio of isopropyl alcohol (IPA) to pure water of 1:1 was introduced into the storage unit 15*a*, and the solution was allowed to stand for 30 minutes to fix the 1-PH to the graphene film 12. Thereafter, the 1-PH solution was discharged from the storage unit 15*a*, then 0.001 M hydrochloric acid was introduced into the storage unit 15*a*, and Id-Vg was measured. The local minimum value thereof was read and found to be 229.86 mV (first CNP value).

Next, after hydrochloric acid was discharged from the storage unit 15*a*, a sample solution containing 200 μM of diacetyl and 2 μM of sodium cyanoborohydride (SCB) was introduced into the storage unit 15*a* and allowed to stand for 30 minutes. Thereafter, the sample solution was discharged from the storage unit 15*a*, then 0.001 M hydrochloric acid was introduced into the storage unit 15*a*, and Id-Vg was measured. The local minimum value thereof was read and found to be 247.57 mV (second CNP value).

It is clear that there is a significant difference (difference: 17.71 mV) between the first CNP value and the second CNP value, and it is found that diacetyl could be detected by this experiment.

Experimental Example 2

An experiment was performed in the same manner as in Experimental Example 1 except that a 10 mM ortho-phenylenediamine (o-PDA) solution was used instead of the 10 mM 1-PH solution, and 0.001 M hydrochloric acid used twice was changed to 0.01 M hydrochloric acid.

The first CNP value was 228.50 mV, and the second CNP value was 258.50 mV.

It is clear that there is a significant difference (difference: 30 mV) between the first CNP value and the second CNP value, and it is found that diacetyl could be detected by this experiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor device that detects an acetyl compound in a sample, the sensor device comprising:

a storage unit that stores the sample;

a sensor section that comes into contact with the sample in the storage unit and detects a change in ion density;

a first container and a thin tube that supplies the sample to the storage unit; and an amino compound fixed to the sensor section, wherein the amino compound comprises a cyclic aromatic amino compound, and the cyclic aromatic amino compound is a 1-pyrenebutyric acid hydrazide.

2. The sensor device according to claim 1, wherein the sensor section detects the change in ion density as a change in pH value, a change in potential, or a change in current.

3. The sensor device according to claim 1, wherein the sensor section has a graphene field effect transistor structure in which a graphene film constitutes a channel region, and the graphene film has a surface to which the amino compound having one or more amino groups is fixed.

4. The sensor device according to claim 3, wherein each of the one or more amino groups is protected by a protecting group.

5. The sensor device according to claim 4, wherein the protecting group is a chloro group, a butoxycarbonyl group, a benzyloxycarbonyl group, a fluorenylmethyloxycarbonyl group, a trichloroethoxycarbonyl group, an allyloxycarbonyl group, a phthaloyl group, or a toluenesulfonyl group.

6. The sensor device according to claim 1, wherein the sample is in an acidic state in the storage unit.

7. The sensor device according to claim 1, wherein the sample coexists with a Schiff base in the storage unit.

8. The sensor device according to claim 1, wherein the sample coexists with an amino group-modified charge-labeled molecule in the storage unit.

9. The sensor device according to claim 1, wherein the sample is in a liquid form in the storage unit.

10. The sensor device according to claim 1, wherein the sample is in a gaseous form in the storage unit.

11. A sensor device that detects an acetyl compound in a sample, the sensor device comprising:

a storage unit that stores the sample;

a sensor section that comes into contact with the sample in the storage unit and detects a change in ion density; and an amino compound fixed to the sensor section, wherein the sensor section has a graphene field effect transistor structure in which a one-layer graphene film constitutes a channel region, the graphene film has a surface to which the amino compound having one or more amino groups is fixed, the amino compound comprises a cyclic aromatic amino compound, and the cyclic aromatic amino compound has an amino group at each of two adjacent carbon atoms.

12. The sensor device according to claim 11, wherein the cyclic aromatic amino compound contains an ortho-phenylenediamine compound.

13. A sensor device comprising:

a substrate;

a sensitive film provided on the substrate;

a first electrode connected to one end of the sensitive film;

a second electrode connected to another end of the sensitive film; and an amino compound fixed to the sensitive film wherein the amino compound comprises a cyclic aromatic amino compound, and the cyclic aromatic amino compound is a 1-pyrenebutyric acid hydrazide.

14. The sensor device according to claim 13, wherein the amino compound comprises a ($-NR-NH_2$)(R is any substituent) structure.

15. A sensor device comprising:

a substrate;

a sensitive film provided on the substrate;

a first electrode connected to one end of the sensitive film;

a second electrode connected to another end of the sensitive film; and an amino compound fixed to the sensitive film, wherein the sensitive film is a one-layer graphene film constitutes a channel region, the one-layer graphene film has a surface to which the amino compound having one or more amino groups is fixed, the amino compound comprises a cyclic aromatic amino compound, the amino compound comprises a structure having an amino group at each of two adjacent carbon atoms, and the two adjacent carbon atoms are two adjacent carbon atoms in one aromatic ring or two carbon atoms bonded by a double bond.

16. The sensor device according to claim 15, wherein the amino compound is a ortho-phenylenediamine.

* * * * *